United States Patent
Randic

(12) 
(10) Patent No.: US 6,275,797 B1
(45) Date of Patent: *Aug. 14, 2001

(54) METHOD AND APPARATUS FOR MEASURING VOICE PATH QUALITY BY MEANS OF SPEECH RECOGNITION

(75) Inventor: Mirko Randic, San Jose, CA (US)

(73) Assignee: Cisco Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/062,209

(22) Filed: Apr. 17, 1998

(51) Int. Cl.[7] .................................................. G10L 15/00
(52) U.S. Cl. ........................................ 704/233; 704/231
(58) Field of Search .................................. 704/226, 227, 704/228, 233, 231, 251

(56) References Cited

U.S. PATENT DOCUMENTS

| | | | |
|---|---|---|---|
| 4,771,425 | 9/1988 | Baran et al. | 370/85 |
| 4,819,228 | 4/1989 | Baran et al. | 370/85 |
| 4,903,261 | 2/1990 | Baran et al. | 370/94.2 |
| 5,020,058 | 5/1991 | Holden et al. | 370/109 |
| 5,313,454 | 5/1994 | Bustini et al. | 370/13 |
| 5,359,646 | 10/1994 | Johnson et al. | 379/27 |
| 5,572,570 | 11/1996 | Kuenzig | 379/1 |
| 5,758,027 | * 5/1998 | Meyers et al. | 706/26 |
| 5,835,565 | * 10/1998 | Smith et al. | 379/5 |
| 5,848,384 | * 12/1998 | Hollier et al. | 704/231 |

FOREIGN PATENT DOCUMENTS

3708002A * 9/1988 (DE) .............................. G10L/3/00

OTHER PUBLICATIONS

IBM Corporation "IBM Voice Type: IBM Speech Programmer's Guide, Introductory Section" Dec. 5, 1997, pp. 1–21.

* cited by examiner

Primary Examiner—William Korzuch
Assistant Examiner—Angela Armstrong
(74) Attorney, Agent, or Firm—Marger Johnson & McCollom, P.C.

(57) ABSTRACT

A method for testing the voice path in a communication network by using speech recognition. The method includes generating transmissible voice signals, preferably, computer generated voice signals which test predetermined voice path characteristics. The voice signals are transmitted in digitized packet form from a sending computer to a receiving computer at the other end of the voice path. The received voice signals are interpreted by a speech recognition engine which identifies speech patterns in the received voice signals. The speech patterns are then compared to the reference speech patterns of the voice signals sent from the sending computer and a voice path quality factor is generated as a result of this comparison. The voice path quality factor is a relative indicator of the quality of transmission and processing of the voice path. The voice quality factor can be used to fine tune and manage communication networks which transmit digitized voice data packets.

30 Claims, 4 Drawing Sheets

METHOD AND APPARATUS FOR MEASURING VOICE PATH QUALITY BY MEANS OF SPEECH RECOGNITION

BACKGROUND OF THE INVENTION

1. Field of the Invention

The present invention relates to a method for testing a communication network system and, more particularly, to using speech recognition to measure voice path quality in communication networks.

2. Description of the Related Art

Packet-based wide area networks provide communication channels that are used for transmitting voice data. A sender at one end of the network needs some way of telling whether the voice data is transmitted and intelligibly received at a destination point in the network. Thus, a need exists for testing and measuring the quality of the communication channel used for transmitting voice data over a packet based network.

Conventional test equipment used for testing telephone networks verify the integrity and continuity of telephone lines. For example, analog telephone lines are traditionally tested by using loop back systems that make a large number of measurements including D.C. voltage levels, D.C. voltage level offsets, A.C. impedances, frequency and phase responses, and the like. The loop back system then performs an extensive analysis of these measurements to determine whether the telephone line meets predetermined quality levels.

Digital telephone systems are tested by inserting a pseudo-random digital sequence at one access point in the telephone network and analyzing the received digital sequence for errors at a second access point. Neither of these test methods provide an objective measurement standard for evaluating the quality of voice signals transmitted over packet based data networks.

The primary concept underlying the design of traditional telephony networks requires certain minimum performance standards for each network segment or element to ensure adequate end-to-end voice quality. Wide Area Networks ("WANs") and Local Area Networks ("LANs"), on the other hand, are designed based on obtaining the best performance or effort of each of its components or sub-systems with virtually no minimum performance requirements for the network segment or element.

A distributed network, such as a WAN or a LAN, includes multiple subnetworks connected together through different network processing nodes such as routers, switches, etc. In order to test the continuity of the communication link through the entire network, each processing element or node in the link is individually tested. Testing each network processing node is time consuming and often inadequate to test the quality of the voice link because during any given voice conversation, the voice packets from one user to another are routed through different paths depending on network congestion and other similar considerations. Also, the voice path for incoming data packets may be different than the voice path for outgoing data packets. Thus, the quality of the voice link in a single conversation can vary depending on the quality of the voice paths used to route the different data packets.

A distributed network can also include network processing equipment from a variety of manufacturers. Each equipment manufacturer may use different testing procedures for evaluating equipment performance. Thus, test results for network subsystems comprising several individual pieces of equipment may be disjointed making it difficult to evaluate the performance of the overall network or to identify poorly performing equipment.

A conventional method of testing voice quality in distributed networks involves one person simply establishing a communication link from a first location in the network to another person in a remote location. The two people determine whether the connection was made properly and then evaluate the quality of the voice signal at both ends of the link. This end-to-end testing method based on the statistical interpretation of human listeners is called Mean Opinion Score ("MOS").

Manual testing of this type require the people conducting the tests to make subjective judgments regarding voice quality. Because evaluation of voice quality varies depending on the personal experience, training, health, etc. of the people evaluating the telephone system, subjective evaluation techniques are inherently unreliable. Moreover, subjective tests do not provide qualitative, numeric results or scores that can be easily evaluated by others or by computers.

Accordingly, a need remains for a method of measuring voice path quality in a communication networks which generates reproducible, objective, and easily evaluated results without human interaction.

SUMMARY OF THE INVENTION

Digitized voice signals are transmitted from a sending computer or terminal to a receiving computer or terminal at the other end of the communication link. The digitized voice signals are evaluated by a speech recognition engine that identifies speech segments in the received voice pattern and produces a textual form of the recognized speech. The resulting text file is compared with a reference text file to generate a voice path quality factor. The reference text file is a file generated by a speech recognition engine by processing a non-distorted common reference voice pattern. There can be more than one unique reference voice pattern with different voice properties. Each voice property, in turn, is differently susceptible to distortion from different distortion sources. Thus, by testing the voice path using different voice patterns, distortion patterns arise which can be used to identify the source of distortion in different network elements or segments.

The voice path quality factor is an objective indicator of transmission and processing quality of the communication link. The voice path quality factor is used to fine tune and condition the communication network under test. The voice path quality factor is also used to indicate a threshold level of operation during system level testing of the communication network. The voice path quality factor is particularly helpful for Internet Service Providers to test the voice path quality of distributed networks.

The foregoing and other objects, features and advantages of the invention will become more readily apparent from the following detailed description of a preferred embodiment which proceeds with reference to the accompanying drawings.

DETAILED DESCRIPTION OF THE INVENTION

Figure 1:
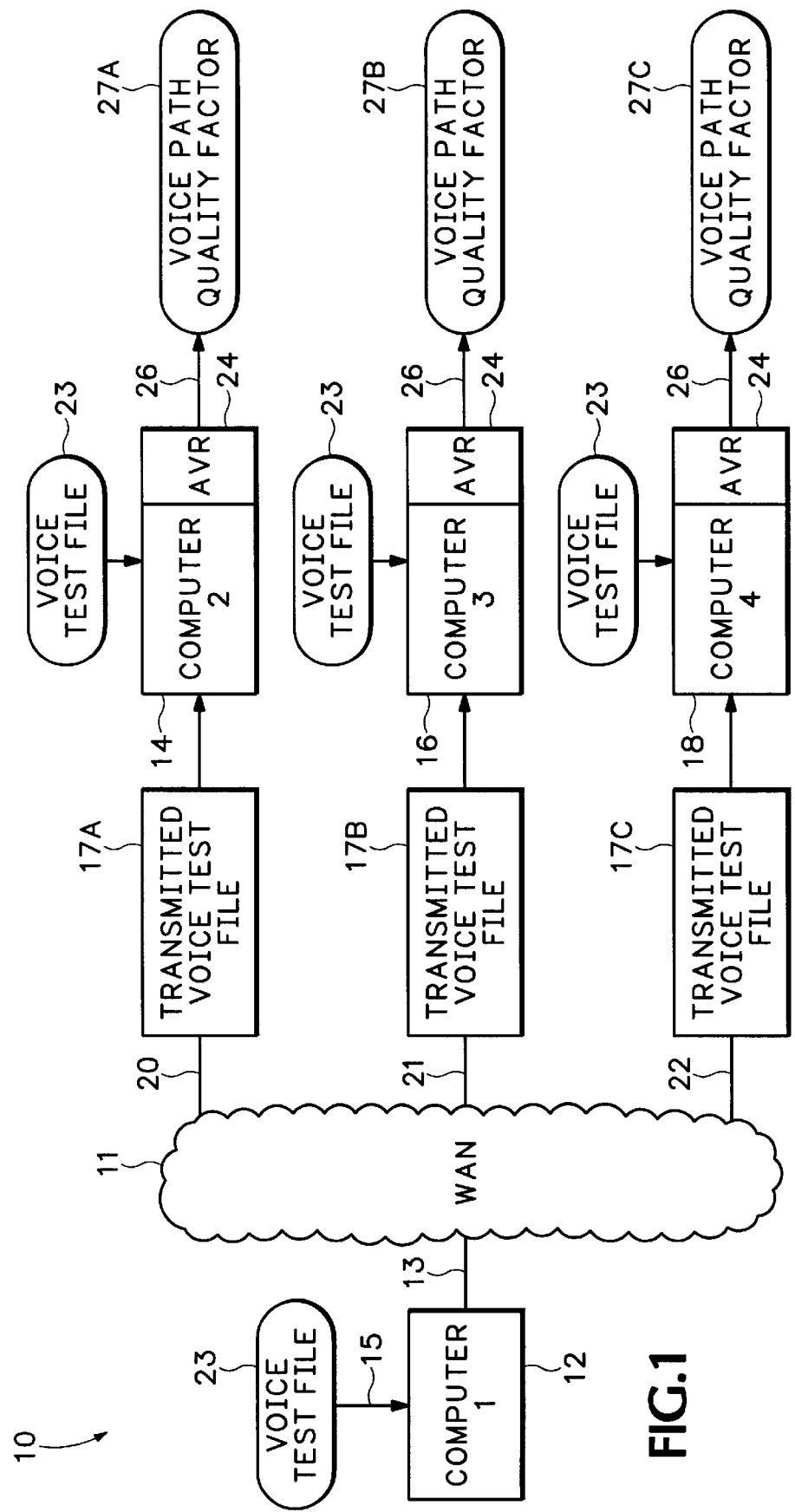
FIG. 1 is a block diagram of a communication network utilizing the test method according to the present invention.

Referring to FIG. 1, a communication network 10 includes a sending computer 12, a plurality of receiving computers 14, 16, and 18 coupled together by a Wide Area Network ("WAN") 11. The computer 12 contains a voice test file 23. The computer 12 converts the voice test file 23 into Internet Protocol ("IP") packets that are then routed to one or all of the computers 14, 16, and 18 through WAN 11.

The network processing nodes in WAN 11 select an appropriate voice path for routing the voice test file 23 to computers 14, 16, and 18 depending on a variety of factors including network load at the time of transmission. Thus, voice path 20 from computer 12 to computer 14 can take a variety of different routes within WAN 11 which can have an affect on the quality of transmission of the voice test file 23. Similarly, voice path 21 and 22 from computer 12 to computers 16 and 18, respectively, can take a variety of different routes within WAN 11 which can affect the quality of transmission of the voice test file 23.

Voice test file 23 is preferably a computer generated digitized voice packet file which contains vocabulary and language models which test the transmission quality of the voice path under test, like voice paths 20, 21, and 22. Alternatively, voice test file 23 is a digitized voice packet file of recorded and processed speech directly input by an operator at computer 12. Several off the shelf computer programs currently exist which record speech input directly into the computer 12 by an operator and prepare digitized voice packets for transmission over WANs like WAN 11. Included in this group of voice recognition computer software programs is ViaVoice™ by IBM Corp. and NaturallySpeaking™ from Dragon Systems Inc. of Newton, Mass.

Receiving computers 14, 16, and 18 include an output terminal 26 for outputting voice path quality factors 27A, 27B, and 27C. Voice path quality factor 27A, 27B, and 27C are an objective indicator of the quality of transmission and processing of the voice path under test. Voice path quality factor 27A, 27B, and 27C are used to test the performance of communication network 10, and more particularly, of voice paths 20, 21, and 22 in WAN 11. Voice path quality factor 27A, 27B, and 27C are explained further below with reference to FIG. 4.

Computers 14, 16, and 18 include an Automatic Voice Recognition ("AVR") system 24. The AVR system 24 recognizes speech in the digitized voice data packets provided in the voice test file 23 received at input terminals 15. The AVR system 24 compares the speech patterns in the transmitted voice test files 17A, 17B, and 17C with speech patterns of the voice test file 23 previously stored in the receiving computers 14, 16, and 18. The result of this comparison is voice path quality factors 27A, 27B and 27C. The AVR system 24 converts the digitized voice data packet received to speech and vice versa using one of the above-mentioned voice recognition software programs.

Figure 2:
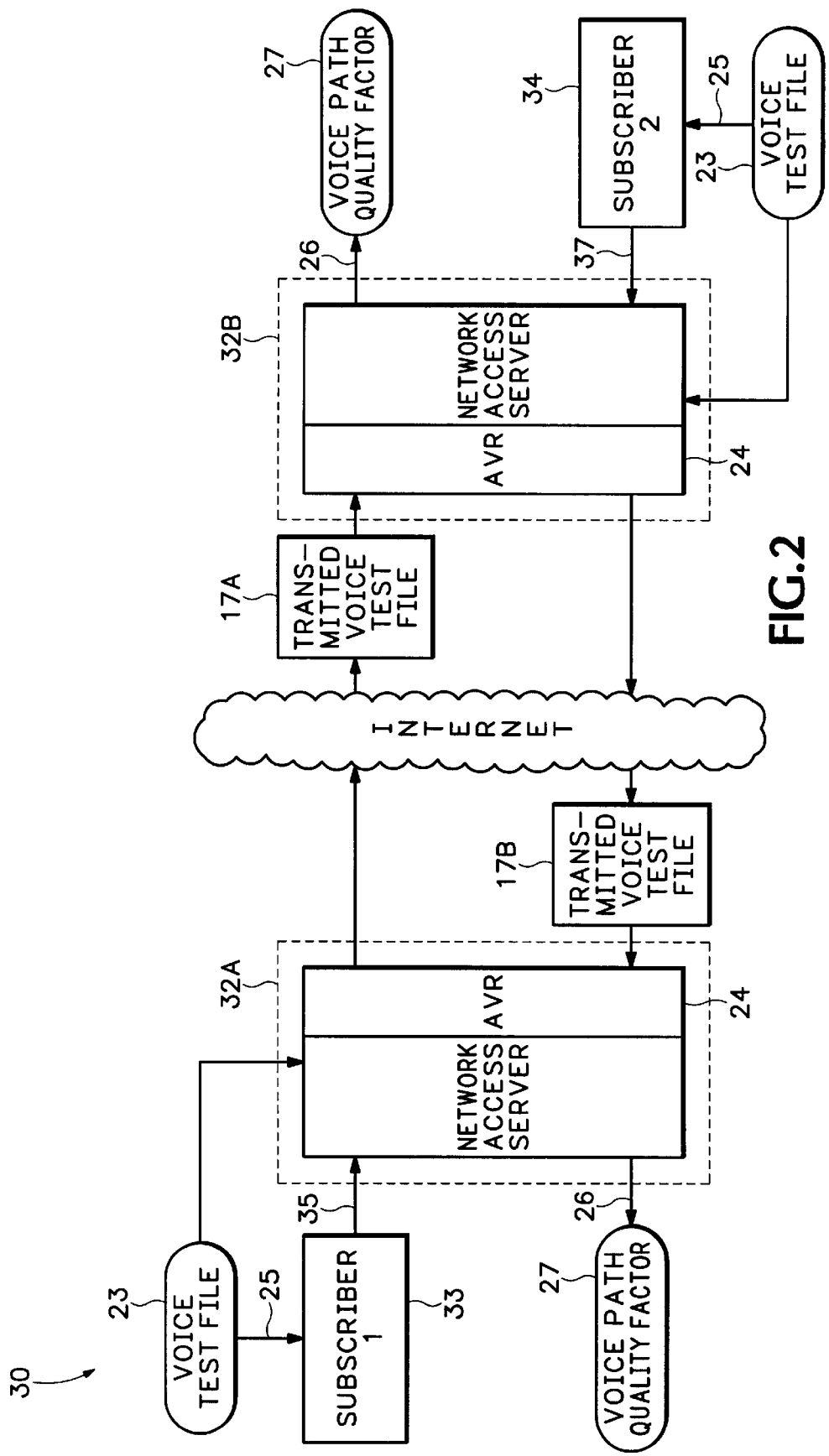
FIG. 2 is a block diagram of alternate communication network utilizing the test method according to the present invention.

FIG. 2 is an alternate communication network utilizing the test method of the present invention. Communication network 30 includes Internet Service Providers ("ISPs") 32A and 32B. ISPs 32A and 32B can be the same or different service providers. The ISP 32A is connected to a subscriber 33 and the ISP 32B is connected to a subscriber 34 through communication links 35 and 37, respectively. ISPs offer internet connectivity to multiple subscribers such as subscribers 33 and 34. ISPs provide different types of service. Voice quality will vary in part depending on the type of service and connection the subscribers 33 and 34 have purchased from the ISPs 32A and 32B, respectively. The path that digitized voice packets follow from subscriber 33, for example, to subscriber 34 will vary depending on a variety of factors including the network load at the time of transmission and the type of service subscriber 33 has purchased from the ISP 32A.

Subscribers 33 and 34 include a voice test file input terminal 25 for receiving a voice test file 23. As with communication network 10 shown in FIG. 1, voice test file 23 is preferably a digitized computer generated speech file transmissible through communication links 35 and 37. As mentioned above, voice test file 23 can also be voice input directly by an operator to subscribers 33 and 34 through, for example, a microphone connected to subscribers 33 and 34. The inputted voice signals are then processed into a digitized speech file transmissible through communication links 35 and 37. Providers 32A and 32B include an AVR system 24 for recognizing speech patterns in the transmitted voice test files 17A and 17B and the voice test file 23. The speech patterns of transmitted voice test files 17A and 17B are then compared to the speech patterns in file 23. The result of this comparison is voice path quality factor 27 which is an objective indicator of the quality of processing and transmission of voice paths 35 and 37. Voice path quality factor 27 is provided to output terminal 26.

Figure 3:
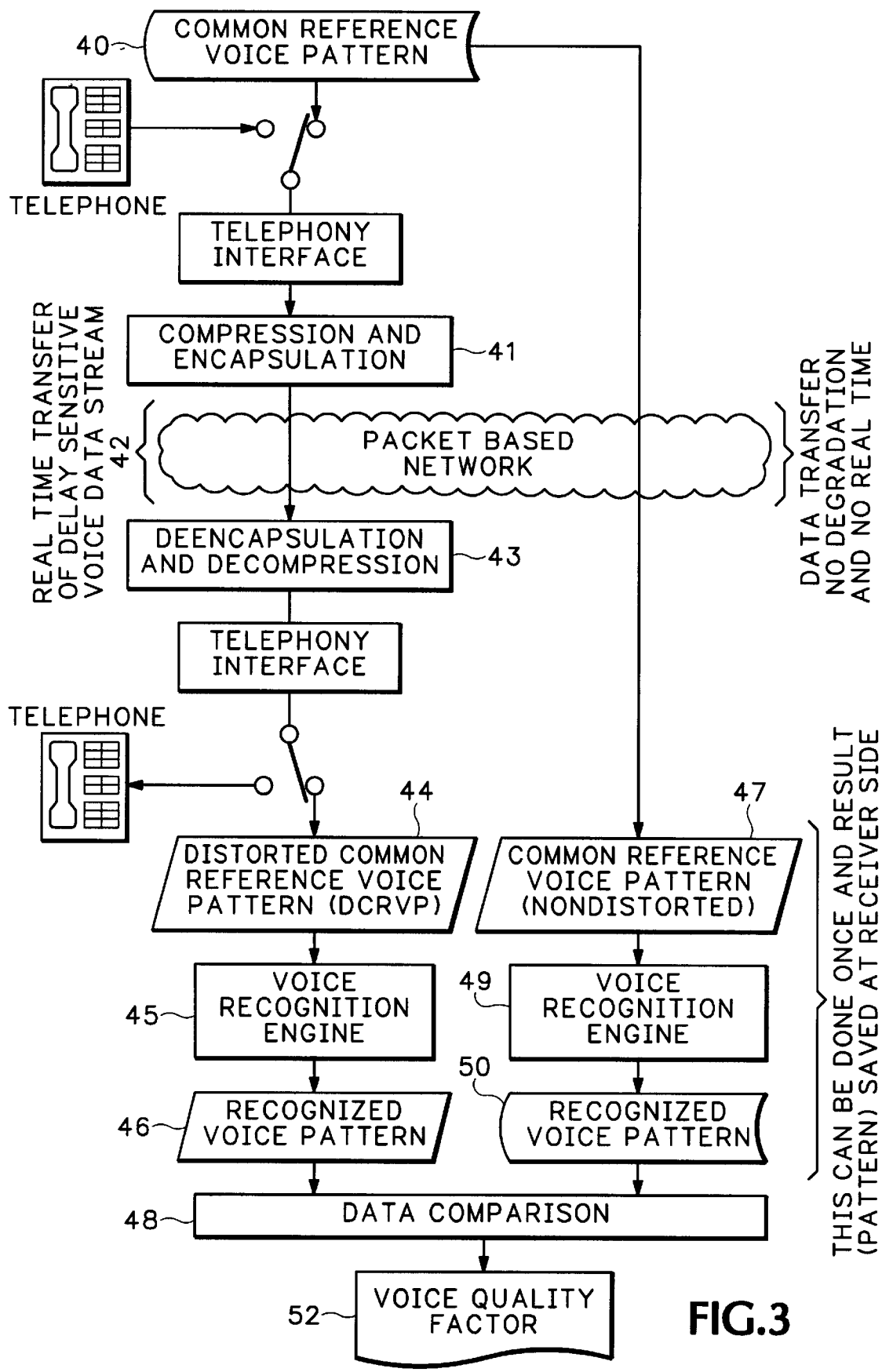
FIG. 3 is flow chart of the test method according to the present invention.

The operation of communication networks 10 and 30 shown in FIGS. 1 and 2 will be described with reference to FIG. 3. Voice test file 23, as mentioned above, is generated by a computer at step 40. Voice test file 23 contains common reference voice patterns or speech characteristics that test the integrity of voice paths 20, 21, 22, 35, 37. For example, voice test file 23 can include long sentences that segment the test file 23 over a wide variety of different paths inside the WAN 11. Before voice test file 23 is transmitted through a corresponding voice path under test, voice test file 23 is compressed and encapsulated at step 41.

At step 42, voice test file 23 is transmitted to a receiving computer through the voice path under test. For example, if voice path 20 between computer 12 and computer 14 is tested, voice test file 23 is sent from computer 12 to receiving computer 14. If voice path 35 between subscriber 33 and subscriber 34 is tested, the voice test file 23 is sent from subscriber 33 to subscriber 34 through provider 32A. It should be apparent to a person skilled in the art that voice test file 23 can be sent simultaneously from computer 12 to receiving computers 14, 16, and 18 thereby simultaneously testing the voice path 21, 22, and 23. The sending and receiving computers can also be switched with anyone or all of computers 14,16, and 18 sending voice test files 23 to computer 12.

Step 41 includes generating the digitized voice data. Digitized voice is a continuous stream of data that is compressed and packetized before being sent through the packet network. Different methods having different properties exist for compressing and encapsulating data at the sending computer 12. Once data has been compressed and encapsulated using a selected protocol, the data is transported between network nodes at step 42 on its way to the receiving computer 14, 16, or 18 at step 44. For an average coast to coast voice communication over the IP packet network, there are approximately 22 hops between different networks nodes, e.g., routers.

Each node or router is configured to prioritize different packets prior to sending them to the next adequate node or router. Although real time application packets generally have higher priority, some packets are delayed by the node queue. Worse yet, some packets are never sent because of queue priorities built into the queueing algorithms of nodes and routers.

Computers 14, 16, and 18 examine the data packets received for the existence of transmission errors and timeliness of delivery. Once this preliminary process is completed, the data packets are decompressed and deencapsulated at step 43 using decompression algorithms resident in the receiving computers 14, 16, and 18. Decompression algorithms decompress data packets using a variety of mechanisms. Some decompression algorithms are more error or missing packet resistant than others. Additionally, some decompression algorithms have the ability to substitute missing or corrupted data packets with, for example, data reflecting silence. Other decompression algorithms interpolate data in an effort to replace the missing packet. As a result of these processes, a continuous digital data stream is generated at the receiving end of the network at step 44.

Voice test file 17 is received by computer 14, 16, or 18, respectively, depending on which voice path is under test. Several systems and processes along the voice path under test may alter the voice test file 23 sent by computer 12 from the voice test file 17 actually received by computers 14, 16 or 18. Alteration of the voice test file 23 can occur during compression, encapsulation or packetization, packet transport, decompression, and decapsulation or depacketization. For example, end-point acoustic environments including the acoustic spaces in which the connection is terminated and electromechanical transducers including any devices which convert electrical signals to or from acoustic waveforms. Furthermore, signal processing transformations including any devices or algorithms which transform the representation of a signal including speech compression and echo cancellation algorithms and packet transmission media which include devices and protocols which package, temporarily store, route, and carry signal representations between two physical locations may also alter the received version of voice test file 23.

These systems and signal transformations often result in voice test file 23 missing data packets. When this happens, there is no time available to request resending of the lost data packets. Thus, the data packet is altered when received by receiving computer 14, 16, or 18.

Each network processing node along the communication link established in the WAN 11 can have some impact on the perceived voice quality of the connection. In many cases, these impacts are independent between network processing nodes, but some dependencies do exist. For example, the performance of signal processing algorithms are often affected by the quality of the acoustic environment in which the initial voice test file is generated or recorded.

Even when independent, however, these impairments are generally cumulative along the communication link. These impairments may also be subjectively linked together. For example, long propagation delays introduced in a packet transmission medium can increase the perceptibility of an echo caused by a hybrid mismatch between a telephone and its line interface at the other end of the connection. By themselves, both the echo and propagation delay might not be perceptible, but together, they increase subjective noticeability of the echo. Moreover, impairments can affect the transmission of individual voice data packets.

At step 45, the received voice test file 17 is fed into AVR system 24. At step 46, the received voice test file 17 is processed by AVR system 24. AVR system 24 recognizes speech patterns in the transmitted voice test file 17 at step 46. Voice test file 23 is provided to the receiving computers 14, 16, or 18 at step 47. As with the transmitted voice test file 17, voice test file 23 is fed into AVR system 24 at step 49 and is processed by AVR system 24 at step 50.

AVR system 24 recognizes speech patterns in both the originally sent voice test file 23 and the transmitted voice test file 17 and compares, at step 48, the interpreted speech patterns in transmitted test file 17 with the speech patterns of the originally sent voice test file 23. The comparison of the received speech patterns in test file 17 with voice test file 23 preferably includes determining the number of matching letters, words, or sentences between transmitted voice file 17 and stored voice test file 23. The comparison of both of these files generates a voice path quality factor 27 at step 52.

Figure 4:
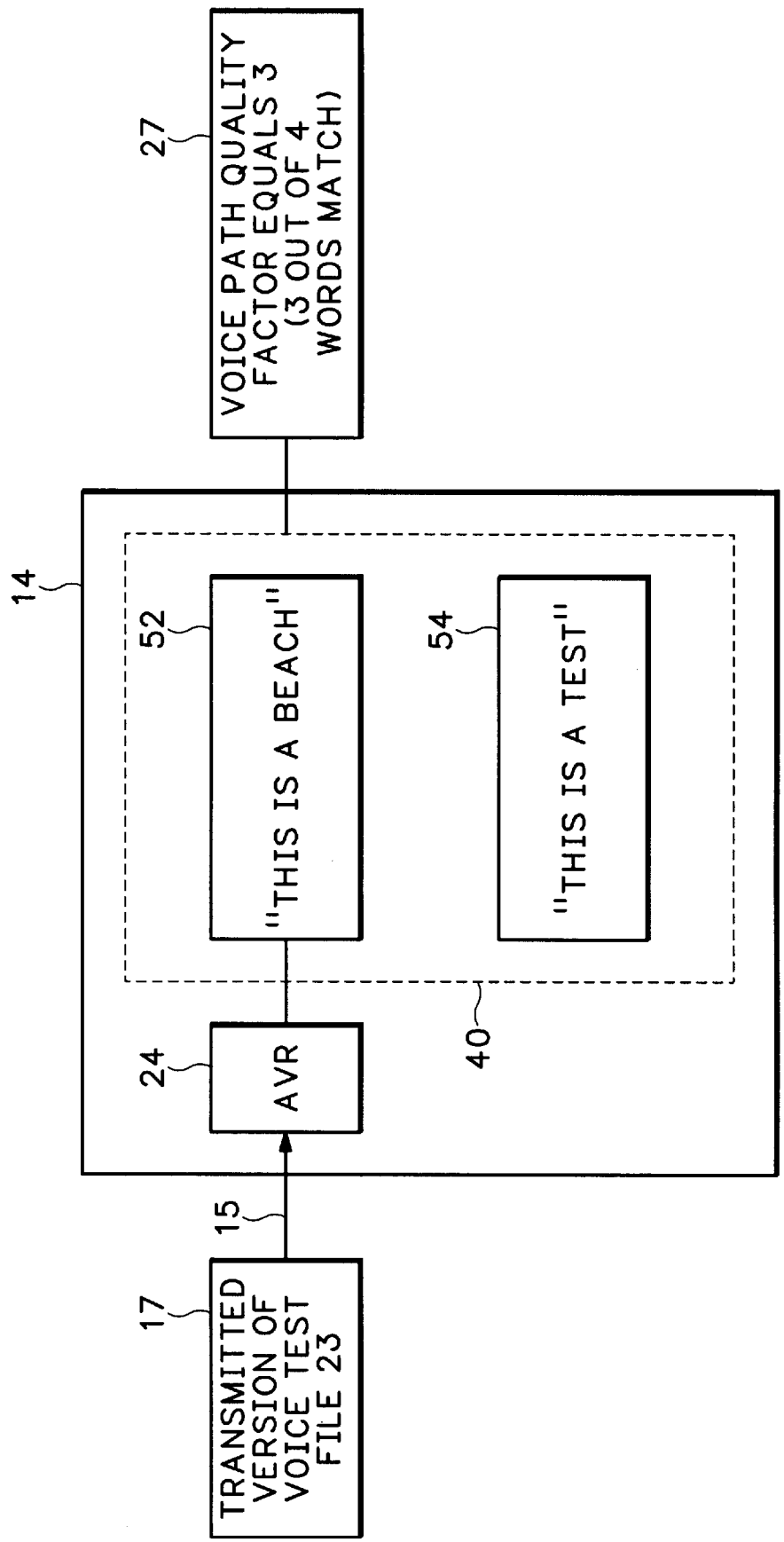
FIG. 4 is an example of the operation of process steps 46, 48, 50, and 51 shown in FIG. 3.

An example of test method steps 46, 48, 50, and 51 is detailed in the block diagram shown in FIG. 4. Voice test file 23 is provided to AVR system 24. Voice test file 23 is interpreted by AVR system 24 to include the sentence "This is a test." Voice test file 17 is received at input terminal 15 of computer 14 and processed by AVR system 24. AVR system 24 recognizes the received voice test file 17 as the sentence "This is a beach." The interpreted voice test file 23 in file 54 is compared to the interpreted received voice test file 17 in file 52 by processor 40 in computer 14.

A voice path quality factor 27 is generated, in this example, by comparing the number of matching words in files 52 and 54. Since there are 3 matching words between the sentences "This is a test" and "This is a beach," the voice path quality factor is 3. Alternatively, voice path quality factor 27 can be expressed as a percentage of matching words or 75% in this example (3 out of 4 matching words).

Voice path quality factor 27 is an objective indicator of the quality of transmission and processing of the voice path under test, like voice path 20. Speech recognition is only one of a variety of properties associated with voice communication, however, speech recognition can be used as a basic measurement of the goodness of the voice path under test.

The resulting voice path quality factor 27 has several advantages over other parameters which measure the quality of voice transmission over a communication network. First, voice path quality factor 27 is reproducible, objective, and suitable for automated system level test because it does not involve human interaction. Second, voice path quality factor 27 is easily evaluated because it can be given a numeric value such as the percentage of matching words or sentences between voice test file 23 and the interpreted voice patterns. Finally, less specialized knowledge and time is required to generate voice path quality factor 27 because readily available off the shelf programs can be used after slight modifications in AVR system 24. For example, many off the shelf programs include a learning capability that improves the system's ability to recognize speech in subsequently received voice files. In order to ensure measurement reproducibility, this learning capability must be removed or reduced because it may affect the objectivity and reproducibility of the results after each iteration of speech recognition.

Voice path quality factor 27 has immediate benefits including feedback of the quality of the voice path under test. Voice path quality factor 27 can be used to fine tune and condition communication networks 10 and 30 to achieve the targeted voice quality. Voice path quality factor 27 can also be used to determine a threshold level of voice path operation during the system level test in the design and manufacturing phase of communication networks 10 and 30. Additionally, voice quality factor 27 can be used to develop the network node packet queueing or prioritizing algorithms.

For example, the voice quality factor 27 can be used to identify routers with under or over utilized bandwidth and to predict how changes in the number or connectivity of network nodes or elements will affect voice quality. Another example of the usefulness of voice quality factor 27 is as follows. Computer 12 transmits the voice test file 23 to computer 14. If the voice path quality factor 27 is below a threshold factor, say less than 75%, then no voice communication is initiated between a user on computer 12 and a user on computer 14. Alternatively, the computer 12 determines that to improve the voice path quality factor to an acceptable level, the sampling rate for converting voice signals into digitized data must be increased. Thus, the computer 12 automatically increases the sampling rate for the capture and digitization of voice test file 23.

Voice path quality factor 27 can also be used by ISPs, like ISP 32A, to address voice path quality in a distributed network. For example, if voice path quality factor 27 indicates a less than suitable voice path, the ISP 32A suggests a different higher bandwidth communication link to WAN 11 which allows a higher voice sample rate that improves voice path quality factor 27 without reducing the rate at which the voice data is transmitted.

Having described and illustrated the principles of the invention in a preferred embodiment thereof, it should be apparent that the invention can be modified in arrangement and detail without departing from such principles. We claim all modifications and variations coming within the spirit and scope of the following claims.

I claim:

1. A method for testing a voice path in a packet-based communication network, comprising:
   receiving at a first communication device a transmitted version of digitized voice test signals after being transmitted over the voice path;
   applying the transmitted version of the digitized voice test signals to a voice recognition system for generating recognized speech patterns for the transmitted version of the digitized voice test signals at the first communication device;
   storing a version of the same digitized voice test signals at the first communication device;
   applying the stored version of the digitized voice test signals to the voice recognition system for generating recognized speech patterns in the stored version of the digitized voice test signals;
   comparing the recognized speech patterns generated from the stored version of the digitized voice test signals with the recognized speech patterns generated from the transmitted version of the digitized voice test signals; and
   generating a voice path quality factor according to the comparison of the recognized speech patterns.

2. The method of claim 1 wherein the voice path is provided over a packet switched network and the digitized voice test signals are encoded into voice packets before being transmitted over the packet switched network, the transmitted version of the digitized voice test signals reflecting packet delays and packet loss while transmitting the voice packets over the packet switched network.

3. The method of claim 2 wherein generating the digitized voice test signals includes capturing voice spoken directly into a second communication device and processing the captured voice for transmission over the network.

4. The method of claim 2 wherein comparing recognized speech patterns includes determining a number of matching words between the recognized voice patterns in the digitized voice test signals and the transmitted version of the digitized voice test signals.

5. The method of claim 2 wherein comparing the recognized speech patterns includes determining a number of matching sentences between the recognized speech patterns in the stored version of the digitized voice test signals and the transmitted version of the digitized voice test signals.

6. The method of claim 1 including disabling or reducing a text learning ability in the voice recognition system before feeding the transmitted version and the stored version of the digitized voice test signals into the voice recognition system.

7. The method of claim 3 wherein the plurality of first communication devices is a corresponding plurality of internet service providers and the second communication device is an internet subscriber.

8. A method for testing voice path quality in a communication network, comprising:
   storing a plurality of sourced speech patterns that are not transmitted over the communication network;
   receiving a plurality of transmitted digitized voice packets, the plurality of digitized voice packets having been transmitted through one of a plurality of voice paths;
   converting the transmitted digitized voice packets into received speech patterns;
   feeding the received speech patterns into a voice recognition system for generating a corresponding plurality of recognized received digital text;
   feeding the sourced speech patterns into the voice recognition system for generating a corresponding plurality of recognized sourced digital text;
   comparing the recognized received digital text with the recognized sourced digital text; and
   generating a voice path quality factor for the selected voice path as a result of the comparison.

9. The method of claim 8 wherein comparing the received digital text to the sourced digital text includes determining a number of matching words between each of the plurality of received and sourced recognized digital text.

10. The method of claim 8 wherein comparing the recognized received digital text to the recognized sourced digital text includes determining a number of matching sentences between each of the recognized received and sourced digital text.

11. The method of claim 8 wherein comparing the recognized received digital text with the recognized sourced digital text includes comparing each of a plurality of recognized received digital text patterns with a corresponding one of a plurality of recognized sourced digital text.

12. The method of claim 11 wherein generating a voice path quality factor as a result of the comparison includes generating a voice path quality factor for each comparison between the recognized received and sourced digital text.

13. The method of claim 8 including disabling or reducing a text learning ability in the voice recognition system before feeding the received and sourced speech patterns into the voice recognition system.

14. The method of claim 8 including varying bandwidth service used in the plurality of voice paths according to the voice path quality factor.

15. A system for testing a plurality of voice paths in a packet-based communication network, comprising:
- means for generating digitized voice test signals transmissible by the communication network through the plurality of voice paths;
- means for directly providing an original version of the digitized voice test signals to a plurality of first communication devices;
- means for transmitting the digitized voice test signals to one of the plurality of first communication devices through one of the voice paths;
- means for receiving a transmitted version of the digitized voice test signals at the one first communication device;
- means for feeding both the transmitted version of the digitized voice test signals and the original version of the digitized voice test signals to a voice recognition system for recognizing speech patterns in the transmitted version of the digitized voice test signals and in the original version of the digitized voice test signals at the one first communication device;
- means for comparing the recognized speech patterns in the original version of the digitized voice test signals with the recognized speech patterns in the transmitted version of the digitized voice test signals; and
- means for generating a voice path quality factor for the one voice path as a result of the comparison.

16. The system of claim 15 wherein the means for generating the digitized voice test signals includes means for generating voice test signals in a computing device and means for packetizing the generated voice test signals for transmission over the network.

17. The system of claim 15 wherein the means for generating the digitized voice test signals includes means for capturing voice spoken directly into a second communication device and means for processing the captured voice for transmission over the network.

18. The system of claim 15 including means for disabling or reducing a text learning ability in the voice recognition system before feeding the transmitted version and the original version of the digitized voice test signals into the voice recognition system.

19. The system of claim 15 wherein the means for comparing recognized speech patterns includes means for determining a number of matching sentences between the recognized speech patterns in the digitized voice test signals and the transmitted version of the digitized voice test signals.

20. The system of claim 15 wherein the means for generating a voice path quality factor includes means for evaluating the voice path quality factor to determine the transmission quality of the voice path.

21. The system of claim 15 wherein the first communication device is an internet service provider and the second communication device is an internet subscriber.

22. An electronic storage medium for storing software for testing voice path quality in a communication network, comprising:
- code for storing a plurality of sourced speech patterns that are not transmitted over the communication network;
- code for receiving a plurality of transmitted digitized voice packets containing the source speech patterns, the plurality of digitized voice packets having been transmitted through one of a plurality of voice paths;
- code for converting the digitized voice packets into received speech patterns;
- code for feeding the received speech patterns into a voice recognition system for generating a corresponding plurality of recognized received digital text;
- code for feeding the sourced speech patterns into the voice recognition system for generating a corresponding plurality of recognized sourced digital text;
- code for comparing the plurality of recognized received digital text with the plurality of recognized sourced digital text; and
- code for generating a voice path quality factor for the selected voice path as a result of the comparison.

23. The electronic storage medium of claim 22 wherein the code for comparing the plurality of received digital text to the plurality of sourced digital text includes code for determining a number of matching words between each of the plurality of recognized received and recognized sourced digital text.

24. The electronic storage medium of claim 22 including code for disabling or reducing a text learning ability in the voice recognition system before feeding the received and sourced speech patterns into the voice recognition system.

25. The electronic storage medium of claim 22 including code for varying a bandwidth service used in the plurality of voice paths according to the voice path quality factor.

26. A computer for analyzing the quality of voice signals in a network, comprising:
- a memory for storing original speech patterns that are not transmitted over the communication network;
- an input for receiving transmitted digitized voice packets, the plurality of digitized voice packets having been transmitted through any one of a plurality of voice paths;
- a decoder for converting the digitized voice packets into received speech patterns;
- a voice recognition engine for converting the received speech patterns into corresponding recognized received digital text and converting the original speech patterns into corresponding recognized original digital text;
- a processor for comparing the recognized received digital text with the recognized original digital text and generating a voice path quality factor according to how closely the recognized received digital text matches the recognized original digital text.

27. A computer according to claim 26 wherein the processor generates the voice path quality factor by determining a number of matching words between each of the recognized received and sourced digital text.

28. A computer according to claim. 26 wherein the processor generates the voice path quality factor by determining a number of matching sentences between each of the recognized received and sourced digital text.

29. A computer according to claim 26 wherein the processor disables or reduces a text learning ability in the voice recognition system before converting the received and sourced speech patterns into recognized digital text.

30. A computer according to claim 26 wherein the input is coupled to a packet switched network and the transmitted digitized voice packets received at the input represent packet delays and packet loss caused while transmitting the digitized voice packets over the packet switched network.

* * * * *